(12) United States Patent
Uchida

(10) Patent No.: US 8,155,646 B2
(45) Date of Patent: Apr. 10, 2012

(54) WIRELESS TERMINAL HAVING A PRE-SCAN DURING IMAGE DISPLAY

(75) Inventor: Kensuke Uchida, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 1012 days.

(21) Appl. No.: 11/863,367

(22) Filed: Sep. 28, 2007

(65) Prior Publication Data

US 2008/0237352 A1    Oct. 2, 2008

(30) Foreign Application Priority Data

Mar. 30, 2007  (JP) ................................ 2007-094494

(51) Int. Cl.
*H04W 4/00*  (2009.01)
*H04B 5/00*  (2006.01)
*H04B 7/00*  (2006.01)

(52) U.S. Cl. ........................ 455/434; 455/41.2; 455/41.3

(58) Field of Classification Search ................. 455/41.2, 455/41.3, 434, 435.1, 435.2; 370/338
See application file for complete search history.

(56) References Cited

U.S. PATENT DOCUMENTS

| | | | | |
|---|---|---|---|---|
| 5,806,005 A * | 9/1998 | Hull et al. | ...................... | 455/566 |
| 6,366,871 B1 * | 4/2002 | Geva | ............................ | 702/188 |
| 6,965,868 B1 * | 11/2005 | Bednarek | ......................... | 705/9 |
| 7,305,225 B2 * | 12/2007 | Benz et al. | ..................... | 455/345 |
| 7,711,388 B2 * | 5/2010 | Noda et al. | .................. | 455/550.1 |
| 7,809,835 B2 * | 10/2010 | Reunamaki et al. | ........... | 709/227 |
| 2004/0233475 A1 * | 11/2004 | Mikuni et al. | .................. | 358/1.15 |
| 2006/0189311 A1 * | 8/2006 | Cromer et al. | ................. | 455/434 |

FOREIGN PATENT DOCUMENTS

| | | |
|---|---|---|
| JP | 2003108271 | 4/2003 |
| JP | 2003348413 | 12/2003 |
| JP | 2004158944 | 6/2004 |

OTHER PUBLICATIONS

"The Oscars? Grammys? Emmys? No, it's the annual cell phone expo," Waterloo (IA)—Cedar Falls Courier, Mar. 14, 2005 posted on wcfcourier.com website at http://wcfcourier.com/business/local/article_593a5cb6-b1f8-58e3-be26-ae852f90e4e9.html.*

* cited by examiner

*Primary Examiner* — Dwayne Bost
*Assistant Examiner* — Larry Sternbane
(74) *Attorney, Agent, or Firm* — Peyton C. Watkins

(57) ABSTRACT

In an imaging device having a wireless module, an increase in undesired power consumption is inhibited, and a time required before establishment of a communications channel with a wireless terminal is shortened. In response to depression of a playback button performed by user by way of an operation section, a control section performs a pre-scan by way of a wireless module before a main scan responding to a request for wireless connection. When having received a request for wireless connection, the control section accepts designation of a wireless terminal serving as a destination of transmission from the user by utilization of a result of the pre-scan prior to a result of the main scan responding to the request for wireless connection.

5 Claims, 3 Drawing Sheets

WIRELESS TERMINAL HAVING A PRE-SCAN DURING IMAGE DISPLAY

CROSS REFERENCE TO RELATED APPLICATIONS

This application claims priority to Japanese Patent Application No. 2007-094494 filed on Mar. 30, 2007, which is incorporated herein by reference in its entirety.

FIELD OF THE INVENTION

The present invention relates to a wireless terminal having a wireless module.

BACKGROUND OF THE INVENTION

An imaging device, such as a digital camera equipped with a wireless module for use in performing wireless communication; e.g., Bluetooth™ or like communication, has recently been proposed. Such an imaging device utilizes a wireless module when capturing photographed image data into an external device, such as a personal computer, portable information equipment, or the like.

Incidentally, after having established a communications channel with a wireless terminal, the wireless module usually must establish wireless contact with the wireless terminal at all times in order to maintain the communications channel. Accordingly, driving of the wireless module entails consumption of a certain amount of power. Meanwhile, the imaging device is often driven by a battery having limited electric capacity. Therefore, the imaging device is expected to reduce undesired power consumption to a minimum. Specifically, reduction of power consumed by the wireless module set on the imaging device to the greatest extent practicable is desired.

Japanese Publication No. 2003-108271 describes the following computer as a computer capable of connecting a wireless communications module which exchanges data with an access point. The computer determines whether or not communication with an access point is possible. When communication is possible, the computer sets to t1 a scan interval time T until the next scan. Meanwhile, when communication is impossible, the computer sets the scan interval time T to t2 which is longer than t1.

Japanese Publication 2003-348413 describes inhibition of transmission of image data at the time of imaging-associated operation which consumes a comparatively-large amount of power as in the case of zooming operation performed by a zoom motor or recharging operation of a flashlight.

Japanese Publication 2004-158944 describes a digital camera capable of toggling between a transmission mode in which photographed image data are transmitted immediately after capture of the image data and a storage mode in which photographed image data are recorded in a storage medium immediately after capture of the photographed image data. This digital camera determines whether or not transmission of an image is possible at start-up of the camera. When a result of determination shows that this digital camera can transmit image data, the camera is activated in a transmission mode. When transmission of image data is impossible, the digital camera is activated in a storage mode.

Incidentally, the imaging device activates the wireless module upon receipt of, for example, a connection request from a user, searches a wireless terminal which is to serve as a destination of connection, and establishes a communications channel with the thus-searched wireless terminal by way of the wireless module. However, a search for a wireless terminal or establishment of a communications channel requires consumption of a certain amount of time. Accordingly, holding the wireless module active at all times and having conducted a search for a wireless terminal, or the like, beforehand regardless of presence/absence of a connection request from the user are also conceivable. However, holding the wireless module active all times entails an increase in undesired power consumption.

SUMMARY OF THE INVENTION

The present invention is intended toward inhibiting an increase in useless power consumed by an imaging device having a wireless module and shortening a time required to establish a communications channel with a wireless terminal.

The present invention provides a wireless terminal comprising:

a pre-scan determination section for determining, after turning-on of power, whether a pre-scan for searching a wirelessly-connectable wireless terminal is required;

a pre-scan execution section for performing the pre-scan by way of a wireless module when the pre-scan is determined to be necessary;

a designation acceptance section for accepting designation of data to be transmitted; and a transmission control section which performs a main scan for searching a wirelessly-connectable wireless terminal by way of a wireless module in response to a request for wireless connection from a user which accepts designation of a wireless terminal serving as a destination of transmission in accordance with a result of the main scan which transmits the data to be transmitted to the designated wireless terminal by way of the wireless module, and which accepts designation of the wireless terminal serving as a destination of transmission, by utilization of a result of the pre-scan prior to a result of the main scan.

In one embodiment of the wireless terminal of the present invention, the pre-scan determination section determines, after turning-on of power, a pre-scan to be necessary when at least one set of data stored in a storage section is displayed on a screen.

In one embodiment of the wireless terminal of the present invention, the wireless terminal further comprises a storage device for storing data, wherein the pre-scan determination section determines, after turning-on of power, a pre-scan to be necessary when a remaining storage capacity of the storage device is smaller than predetermined minimum storage capacity.

In one embodiment of the wireless terminal of the present invention, a period of the pre-scan is shorter than a period of the main scan.

In one embodiment of the wireless terminal of the present invention, a result of the pre-scan includes a display size of data capable of being displayed on a wireless terminal which becomes a candidate for a destination of transmission, and the transmission control section, before accepting designation of data to be transmitted, generates data having been adjusted according to the display size sequentially for each set of data which become a candidate for data to be transmitted, and transmits, to a wireless terminal serving as a destination of transmission by way of the wireless module, the data whose size adjusted in conformity to data to be transmitted when having accepted designation of a wireless terminal as a destination of transmission.

According to the present invention, a pre-scan is performed, as required, after turning-on of power, and designation of a wireless terminal as a destination of transmission is accepted by utilization of a result of the pre-scan prior to a result of main scan performed in response to a request for wireless connection. Therefore, when compared with a case where the scan is not performed prior to the request for wireless connection, establishment of a communications channel with a wireless terminal serving as a destination of communication can be performed more quickly. Further, as a result of the pre-scan being performed as required after turning-on of power, an increase in power consumption can be inhibited, after turning-on of power, when compared with the case where the wireless module is held active at all times and a scan is performed.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION OF THE INVENTION

An embodiment specifically showing the best mode for implementing the present invention will be described hereunder by reference to the drawings.

Figure 1:
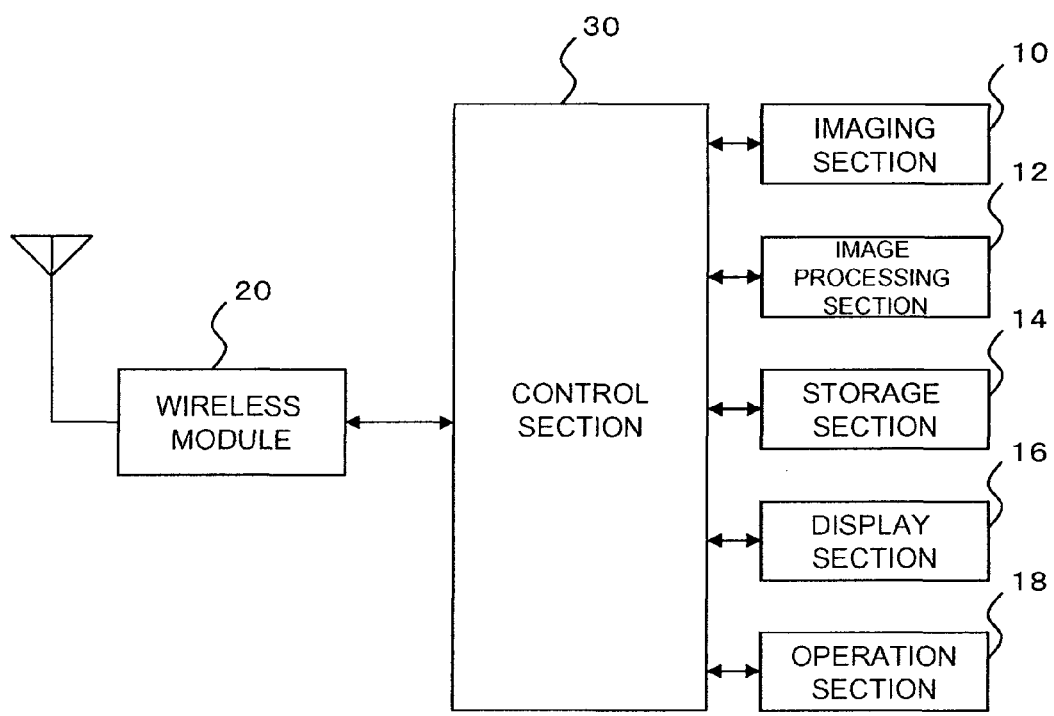
FIG. 1 is a view showing functional blocks of a digital camera of an embodiment of the present invention.

In FIG. 1, the digital camera has individual sections 10 to 18 for embodying functions of the camera; a wireless module 20 for establishing wireless communication with another wireless terminal; and a control section 30 for controlling the overall camera.

The digital camera of the present embodiment displays photographed image data, or the like, on a screen, to thus prompt the user to select desired image data from among the sets of displayed image data. The digital camera also performs wireless communication with a wireless terminal specified by the user, such as another digital camera, a printer, a portable cellular phone, a personal computer, and the like, by way of the wireless module 20, and transmits selected image data. In the present embodiment, such a digital camera more quickly transmits the image data selected by the user to the specified wireless terminal while reducing an increase in power consumption. The present embodiment provides descriptions while the digital camera is taken as an example of the wireless terminal. However, the present invention can also be applied to a device other than a digital camera, so long as the device serves as a wireless terminal comprising a display section for displaying data; a user interface for enabling the user to select, from displayed sets of data, data to be transmitted; and a wireless module for transmitting the selected data through wireless communication.

Respective sections constructing the digital camera will be described in detail hereunder.

The imaging section 10 includes a solid-state imaging element which transfers an image signal which is generated as a result of incident light having been subjected to photoelectric conversion through vertical transmission and horizontal transmission, such as a CCD, a CMOS, and the like. Moreover, the imaging section 10 subjects an analog image signal output from the solid-state imaging element to correlated double sampling, thereby eliminating noise. Moreover, the imaging section 10 amplifies the noise-removed image signal by an amplification factor responsive to imaging sensitivity (e.g., ISO sensitivity); converts the thus-amplified analog image signal into a digital signal; and outputs the digital image signal to an image processing section 12.

The image processing section 12 subjects the image signal output from the imaging section 10 to predetermined image processing, such as white balance processing, pixel interpolation processing, edge processing, and the like; and displays an image signal corresponding to one frame on a display section 16 as image data or stores the image signal in a storage section 14. The display section 16 sequentially displays the image data output from the image processing section 12, thereby acting as an electronic viewfinder. The display section 16 displays at least one set of image data specified from among the sets of image data stored in the storage section 14. An operation section 18 is a user interface by means of which the user operates the imaging device, such as a shutter button, an operation button for setting imaging conditions, a playback button for instructing displaying of image data stored in the storage section 14, and the like.

A wireless module 20 is a module which provides a wireless interface conforming to known wireless communications schemes, for instance, Bluetooth™. In a piconet, which represents the unit of a network created under the Bluetooth™, one wireless module acts as a "master," and a maximum of seven wireless modules can serve as "slaves." In short, a total of eight wireless modules can create one piconet. Although the present embodiment describes wireless modules conforming to Bluetooth™ as an example wireless communication scheme, wireless modules conforming to various wireless communications schemes, such as IEEE 802.11a, IEEE 802.11b, Wireless USB, and the like, can be used.

The wireless module 20 transmits or receives data, such as image data, through wireless communication pursuant to Bluetooth™. The wireless module 20 operates according to any of various operation modes. The operation modes are defined in consideration of a reduction in undesired power consumption. For instance, according to Bluetooth™, a standby mode, an inquiry mode, a call mode, a power-thrifty mode, and the like, are defined as operation modes.

Now, the standby mode refers to a listen status where the wireless module awaits a message from another wireless terminal. The inquiry mode refers to a status where an inquiry packet is transmitted to another wireless terminal located near the master wireless module, to thus authenticate identifications of the other wireless terminals which are to become candidates for slaves. Further, the call mode refers to a status where wireless terminals authenticated by the master are caused to take part, as a slave, in the piconet governed by the master.

Further, a park mode, a hold mode, a sniff mode, and the like, are defined as the power-thrifty mode. The hold mode refers to a mode where the wireless module enters a sleep mode while a connection between the master and a slave is maintained and while AM_ADDR (Active Member Address) for distinguishing between the master and the slave is maintained. The sniff mode refers to a mode where an interval of listening is increased while the connection between the master and the slave is maintained and while AM_ADDR is held. Moreover, the park mode refers to a mode where the wireless module enters the sleep mode by releasing AM_ADDR while the master and the slave are connected together. Before entering the park mode, PM_ADDR (Parked member Address) or AR_ADDR (Access Request Address) is imparted by the master.

As above, the wireless module 20 operates in accordance with each of the operation modes.

The control section 30 functions as a result of a CPU and, by extension, hardware including peripheral circuits of the CPU being caused to operate in a synergistic manner along with a program previously stored in memory provided in the CPU or the peripheral circuits. The control section 30 controls the individual sections 10 to 18 for implementing the foregoing camera functions. Image data, or the like, are transmitted or received between the wireless terminal serving as the master and the wireless terminal serving as a slave by way of the wireless module 20. Moreover, the control section 30 displays; e.g., image data, on a screen, thereby prompting the user to select an image to be transmitted. Subsequently, so long as a communications channel can be established with a destination of transmission, the image data can be transmitted by way of the wireless module 20. However, scanning the wireless terminal which is to serve as a candidate for a destination of transmission by way of the wireless module 20 and establishing a communications channel involve consumption of a certain amount of time.

For these reasons, in the present embodiment, when the user displays image data on the screen, a scan (hereinafter called a "pre-scan," whereas a scan performed in response to a request for wireless connection is called a "main scan") is subsequently performed prior to a request for wireless connection by means of predicting the potential of the displayed image data being transmitted to another wireless terminal. Thus, a scan is performed in advance on the prediction of the potential of wireless communication, thereby shortening the time required to establish a communications channel with a destination of connection when wireless communication is actually performed.

Figure 2:
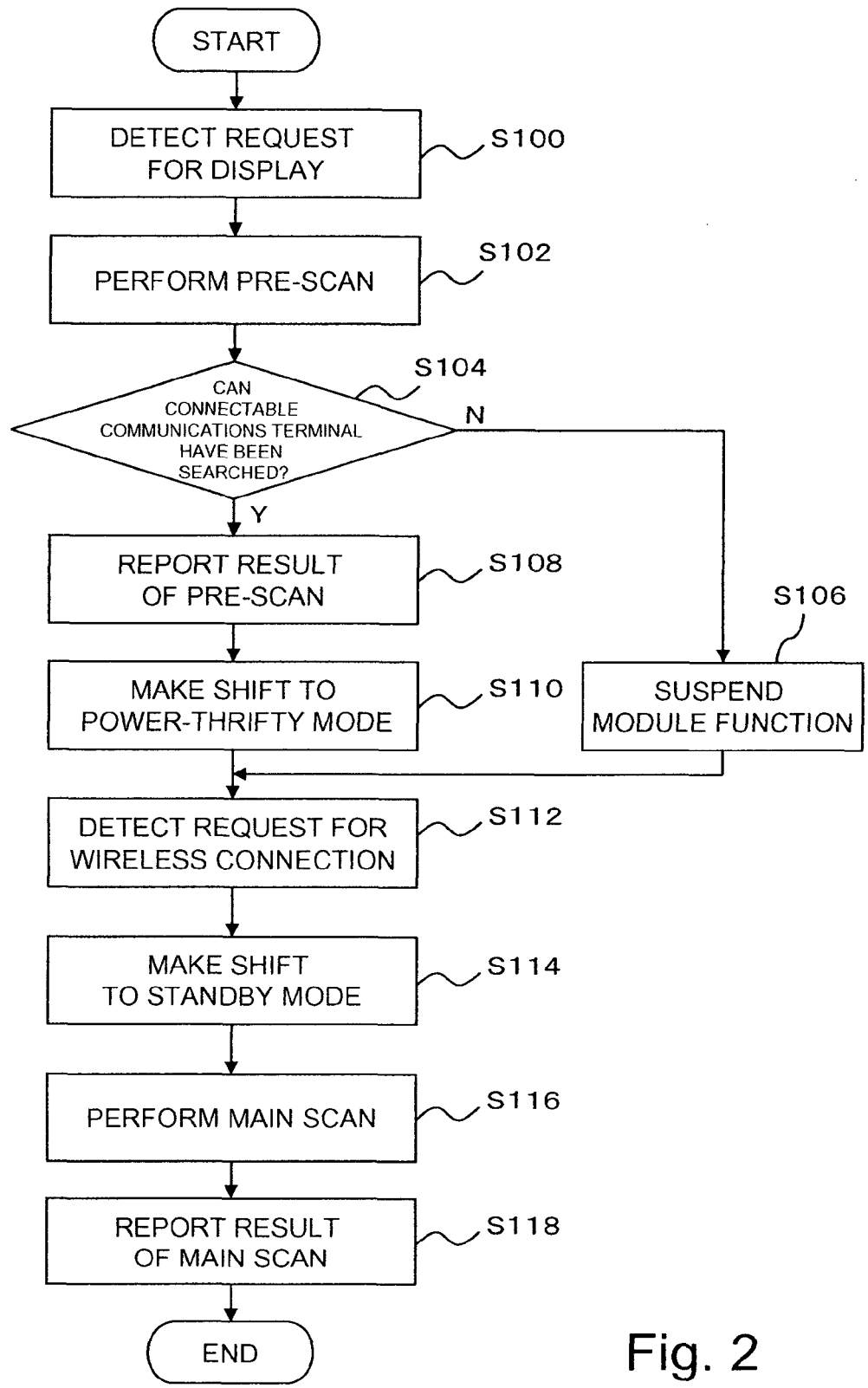
FIG. 2 is a flowchart showing procedures of processing performed by a wireless module when a display request from the user is input to a control section by way of an operation section.

FIG. 2 is a flowchart showing procedures of processing performed by the wireless module 20 when a display request from the user is input to the control section 30 by way of the operation section 18.

Upon detection of a display request having been input to the control section 30 when the user has depressed a playback button (S100), the wireless module 20 enters the inquiry mode in response to the display request and performs a pre-scan (S102). The present embodiment describes, as an example, a case where a pre-scan is carried out when there is detected a display request which is output from the operation section 18 in response to depression of the playback button by the user. However, a pre-scan may also be carried out under any conditions other than depression of the playback button, so long as image data are displayed on the screen under the conditions. For instance, so long as the operation section 18 has a transmission button for transmitting image data and so long as image data are displayed on the screen in response to depression of the transmission button, a pre-scan may also be performed in response to depression of the transmission button. Since image data are displayed on the screen at start-up of the camera, a pre-scan may also be performed in advance in response to start-up of the camera.

Herein, a period of execution of a pre-scan can be set shorter when compared with a period of execution of a main scan which is conducted in response to a request for wireless connection to be described later. In general, as the scan period becomes longer, a terminal (slave) can be found in an area which is further far from the terminal (master) that performs a scan. Meanwhile, a case where image data are exchanged between users, a case where image data are transmitted to a printer in order to print the image data in the digital camera, and like cases, are conceivable as the case where image data are transmitted from the digital camera to another wireless terminal. In these cases, the terminal serving as the master and the terminal serving as the slave are considered to be often located within a comparatively-close distance. Accordingly, there is a great possibility of a desired destination of connection being found even when the period of execution of a scan is set shortly. Further, when the period of execution of a scan is short, power consumed by the wireless module 20 can also be reduced. Therefore, the period of execution of a pre-scan may be set more shortly when compared with the period of execution of a main scan.

When the wireless module 20 can have searched wireless terminals which are to act as slaves by means of the pre-scan (a result of determination rendered in step S104 is affirmative "Y"); namely, when slaves taking part in a piconet governed by the master are present, a piconet is created among the slaves. Moreover, the result of the pre-scan is reported to the control section 30 (S108). The control section 30 generates, from the result of the pre-scan, a list of destinations of transmission showing a list of pieces of information about terminals by means of which connectable wireless terminals are identified; and retains the list of destinations of transmission. Subsequently, the wireless module 20 enters the power-thrifty mode while maintaining its piconet (S110). Meanwhile, when the wireless module 20 has failed to search the wireless terminals which are to become slaves by means of the pre-scan (the result of determination rendered in step S104 is negative "N"), the wireless module 20 halts its functions (S106). Namely, a power supply to the wireless module 20 is halted.

Subsequently, upon detection of a request for wireless connection from the control section 30 (S112), the wireless module 20 enters the standby mode (S114). The wireless module 20 further enters the inquiry mode and performs a main scan (S116). A result of the main scan is reported to the control section 30 (S118).

As mentioned above, the wireless module 20 performs, for instance, a pre-scan prior to a main scan in response to image data being displayed on the screen as a result of depression of the playback button by the user. Thereby, the wireless module 20 previously creates a piconet, in which the wireless module 20 serves as the master before executing the main scan in response to the request for wireless connection. Therefore, when a request for wireless connection from the user has been received actually, the piconet has already been created, and hence processing, such as transmission of image data, or the like, can be performed more quickly.

Figure 3:
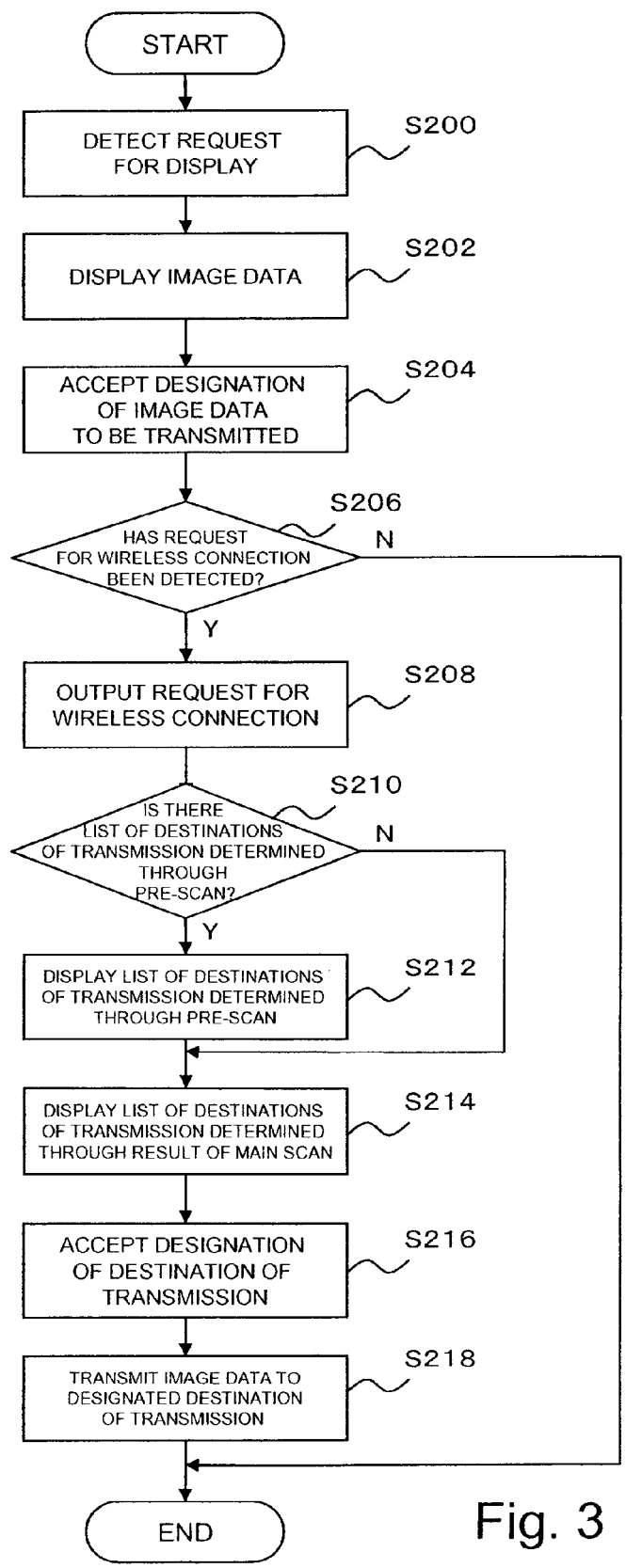
FIG. 3 is a flowchart showing procedures of processing performed by the control section when a request for displaying image data from the operation section is input by means of the user having depressed a playback button.

FIG. 3 is a flowchart showing procedures of processing performed by the control section 30 when a request for displaying image data from the operation section 18 is input by means of the user having depressed the playback button.

In FIG. 3, the control section 30 detects, for instance, the request for a display from the operation section 18 in response to depression of the playback button constituting the operation section 18 by the user (S200). Next, the control section 30 displays image data stored in the storage section 14 in response to the request for a display (S202). The image data to be displayed are, for instance, first or last photographed image data or the image data displayed on the screen last time. Further, the image data may also be list image data formed from a plurality of thumbnails pertaining to the image data.

Subsequently, the control section 30 accepts designation of image data to be transmitted, from among the sets of displayed image data, by way of the operation section 18 (S204). For instance, the user selects desired image data among the image data displayed on the screen, and selection of the image data is detected, whereby designation of the image data to be transmitted is accepted. Moreover, upon detection of the request for wireless connection from the user by way of the operation section 18 (a result of determination rendered in step S206 is affirmative "Y"), the control section 30 outputs a request for wireless connection to the wireless module 20 (S208). The control section 30 detects, for instance, a request for wireless connection such as that provided below. Specifically, for example, when having accepted designation of the image data to be transmitted, the control section 30 makes, by way of the display section 16, an inquiry about whether to transmit the designated image data. Subsequently, when an answer to the effect that transmission is desired has been replied as a response to the inquiry from the user, an input of the request for wireless connection from the operation section 18 is accepted. As a result, the control section 30 detects the request for wireless connection.

Next, when the control section 30 retains the list of destinations of transmission created from previously-described results of the pre-scan (a result of determination rendered in step S208 is affirmative "Y"), the list of destinations of transmission is displayed on the display section 16 (S210). After the list of destinations of transmission determined through the pre-scan has been displayed or when the list of destinations of transmission determined through the pre-scan is not retained (the result of determination rendered in step S210 is negative "N"), the control section 30 acquires from the wireless module 20 the result of the main scan; creates the list of destinations of transmission from the thus-acquired result; and displays the list on the display section 16 (S214). Namely, in the case where the list of destinations of transmission determined from the pre-scan is retained, upon detection of the request for wireless connection, the control section 30 displays, on the screen, the list of destinations of transmission determined from the pre-scan prior to the list of destinations of transmission determined from the main scan. Subsequently, the destination of transmission found by the main scan is added to the list of destinations of transmission, as required, and the thus-added list is displayed.

Next, when the user has accepted, on the basis of the displayed list of destinations of transmission, designation of the destination to which the image data are to be transmitted by way of the operation section 18 (S216), the control section 30 transmits the image data to the designated destination of transmission by way of the wireless module 20 (S218).

Here, the control section 30 can also accept designation of the destination of transmission from the user at a point in time when the list of destinations of transmission determined through the pre-scan is displayed. Consequently, the user can also designate a destination of transmission from the list of destinations of transmission determined through the pre-scan before the list of destinations of transmission determined through the main scan is displayed; and transmit the image data to the destination. Specifically, processing, such as transmission of image data, can be performed more quickly. Moreover, as a result of the period of the pre-scan is set shorter when compared with the period of the main scan, an increase in power consumption can be prevented. In addition, when connectable wireless terminals (slaves) cannot have been found through the pre-scan, a power supply to the wireless module 20 is temporarily suspended, whereby an increase in power consumption can be curtailed to a much greater extent.

Incidentally, performing a scan enables acquisition of terminal information from a wireless terminal which is to serve as a slave. This terminal information includes various types of pieces of attribute information about the wireless terminal. In addition to including an address used for identifying the wireless terminal in the piconet, the attribute information includes a display size (a resolution) which can be provided on the screen of the wireless terminal, and the like. Here, the resolution of image data retained in a digital camera does not always coincide with the resolution of image data which can be displayed on a wireless terminal that is the destination of transmission. For instance, when resolution which can be provided on a wireless terminal corresponding to the destination of transmission is smaller than a resolution of image data retained in a digital camera, it may be the case where the wireless terminal fails to display the image data acquired from the digital camera. Accordingly, before the digital camera transmits image data, it is better to previously convert the resolution of the image data in conformity with the resolution provided by the wireless terminal at the destination of transmission. However, conversion of the resolution of image data involves consumption of a certain amount of time. Therefore, when the control section 30 has performed processing for converting the resolution of image data is performed after having detected the request for wireless connection, a processing time consumed before transmission may become longer. As mentioned previously, the terminal information acquired from the wireless terminal that is to serve as a slave includes information about the resolution of the terminal.

Accordingly, when the wireless terminal which is to serve as a slave can have been found through the pre-scan, the control section 30 may also generate image data whose resolution has been converted previously, in conformity with the resolution of the wireless terminal before accepting designation of image data to be transmitted. The image data to be converted may also be all of sets of image data stored in the storage section 14. However, not all of the sets of the image data are always be transmitted. For this reason, the control section 30 may also generate image data whose resolution has been converted previously, solely in connection with the image data displayed in the display section 16. The reason for this is that the potential of the displayed image data being selected later by the user as image data to be transmitted is comparatively high. Therefore, in relation to such image data, image data whose resolution is converted in conformity with the resolution of the wireless terminal serving as a candidate for the destination of transmission have been generated previously. Thus, as a result of the image data whose resolution is converted has been generated previously, a processing time consumed before transmission can be shortened. When a plurality of candidates for the destination of transmission are present and when the respective candidates have different resolutions, image data whose resolution has been converted in conformity with the resolutions may also be generated. Alternatively, one set of image data whose resolution has been converted in conformity with the lowest resolution may also be generated.

The present embodiment has provided descriptions by means of taking a display request as an example trigger for a pre-scan. However, for instance, when the remaining volume of memory of the storage section 14 is detected at power-on and when the remaining volume of memory is smaller than a predetermined minimum volume of memory, the control section 30 may determine the volume of memory to be difficult to store data and thus perform a pre-scan. In short, when the remaining volume of memory achieved at power-on is smaller than the predetermined minimum volume of memory, new image data which will be acquired by subsequent photographing operations cannot be stored in the storage section 14. Hence, transmission of new image data to another storage device in the network through wireless communication is predicted. Accordingly, the control section 30 may also perform a pre-scan while taking, as a trigger, the fact of the remaining volume of memory achieved at power-on being smaller than the predetermined minimum volume of memory. As a result, the potential of occurrence of an instruction for transmission of data by the user can be predicted, and a more efficient scan and a transmission sequence can be realized.

PARTS LIST

10 imaging section
12 image processing section
14 storage section
16 display section
18 operation section
20 wireless module
30 control section

What is claimed is:

1. A wireless terminal having a plurality of modes, including an image display mode for displaying an image stored in memory, the wireless terminal comprising:
    a detection section for detecting that the image display mode is selected;
    a pre-scan execution section for performing pre-scan for discovery of a wireless area network by way of a wireless module when the detection section detects the image display mode is selected by a user;
    a designation acceptance section for accepting designation of data to be transmitted; and
    a transmission control section configured to:
    perform a main scan for searching for a wireless terminal using the wireless area network by way of a wireless module in response to a request for wireless connection from the user;
    accept designation by the user of a wireless terminal to serve as a destination of transmission in accordance with a result of the main scan; and
    transmit the data to be transmitted to the designated wireless terminal by way of the wireless module;
    wherein user designation of the wireless terminal to serve as a destination of transmission is facilitated by a result of the pre-scan prior to a result of the main scan.

2. The wireless terminal according to claim 1, wherein the plurality of modes comprises an image capture mode.

3. The wireless terminal according to claim 1, further comprising:
    a storage device for storing data, wherein:
    a pre-scan determination section determines, after turning-on of power, a pre-scan to be necessary when a remaining storage capacity of the storage device is smaller than predetermined minimum storage capacity.

4. The wireless terminal according to claim 1 wherein a duration of the pre-scan is shorter than a duration of the main scan.

5. The wireless terminal according to claim 1, wherein a result of the pre-scan includes a display size of data capable of being displayed on a wireless terminal which becomes a candidate for a destination of transmission; and
    the transmission control section, before accepting designation of data to be transmitted, generates data having been adjusted according to the display size sequentially for each set of data which become a candidate for data to be transmitted, and transmits, to a wireless terminal serving as a destination of transmission by way of the wireless module, the data whose size adjusted in conformity to data to be transmitted when having accepted designation of a wireless terminal as a destination of transmission.

\* \* \* \* \*